United States Patent [19]

Kitani

[11] Patent Number: 4,472,036
[45] Date of Patent: Sep. 18, 1984

[54] PROGRESSIVE MULTI-FOCAL LENSES

[75] Inventor: Akira Kitani, Fussa, Japan

[73] Assignee: Kabushiki Kaisha Hoya Lens, Tokyo, Japan

[21] Appl. No.: 253,264

[22] Filed: Apr. 13, 1981

[30] Foreign Application Priority Data

Apr. 12, 1980 [JP] Japan .................................. 55-48535

[51] Int. Cl.$^3$ ............................................... G02C 7/06
[52] U.S. Cl. ..................................................... 351/169
[58] Field of Search .................................. 351/168–172

[56] References Cited

U.S. PATENT DOCUMENTS 4,274,717 6/1981 Davenport ........................... 351/169
4,307,945 12/1981 Kitchen et al. ...................... 351/169

FOREIGN PATENT DOCUMENTS 2393335 12/1978 France .
2020847 11/1979 United Kingdom .

OTHER PUBLICATIONS

DeCarle, J. T.; "Bifocal and Multifocal Contact Lenses"; *Contact Lenses;* vol. 2, 1981; pp. 571-591.

Primary Examiner—John K. Corbin
Assistant Examiner—Scott J. Sugarman
Attorney, Agent, or Firm—Cushman, Darby & Cushman

[57] ABSTRACT

A progressive multi-focal lens is provided of the type having a distant viewing zone, a near viewing zone, and a progressive zone therebetween. The surface refractive power increases vertically from an upper portion of the lens to a lower portion as the line of sight scans from a distant view to a near view. Side zones are provided beside the progressive and near viewing zones. The side zones are spheric surfaces, with a dioptric refractive power in accordance with one embodiment being the arithmetic mean value of the refractive power of the near and distant viewing zones. This eliminates astigmatism problems in the side areas and permits normal side sight.

2 Claims, 4 Drawing Figures.

PROGRESSIVE MULTI-FOCAL LENSES

BACKGROUND OF THE INVENTION

Field of the Invention

This invention relates to an improvement in progressive multi-focal lenses, and more particularly relates to an ophthalmic lens having a so-called progressive refractive surface. In this type of construction a surface refractive power (or index) is progressively increased vertically from an upper portion to a lower portion of the lens, as the line of sight scans from a distant view to a near view, so as to help the control (or accommodation) of the human eyes.

Background of the Prior Art

Although the progressive refractive surface may be formed on a convex, a concave, or a convex-concave surface, it is generally formed on the convex side surface. For simplification in explanation, the present discussion deals with an example where the progressive refractive surface is formed on a convex surface side. It should be understood, however, that this invention is of course also applicable to either one of the concave or the concave-convex surface.

A general construction of the conventional progressive refractive surface comprises a spheric distant viewing zone having a desired surface refractive power at the top, a spheric near viewing zone having a desired surface refractive power larger than that of the distant viewing zone, and an aspheric progressive viewing zone which is formed between the two other zones. The progressive zone is a serial smooth local spheric area such that its surface refractive power progressively increases along a vertical direction.

Most of this kind of progressive multi-focal lenses operate such that the line of sight essentially moves along this progressive zone, when a person's line of sight moves from the distant view to the near view field. However, since each of these conventional progressive focal lenses has an area having a large astigmatism at side portions of the progressive zone and the near viewing zone, normal side sight is therefore restricted.

SUMMARY OF THE INVENTION

Various proposals have been made to overcome this drawback of the side area having said astigmatism. These include arrangements disclosed in U.S. Pat. Nos. 4,055,379; 4,056,311; and 4,062,629; French Pat. No. 69,30906; French additional Pat. No. 70,04474 and Provisionally published French patent application No. 72,26947; and German provisionally published patent application No. 2610203. All of these propose to dilute the astigmatism or render it harmless, but are not successful in essential elimination of the astigmatism. Hence, every one of these prior art approaches still has considerable astigmatism at the sides of the progressive zone and the near viewing zone, and as far as comparing this portion its sight area is arranged to be narrower for the wearer than the normal mono-focal lens.

It is a primary object of this invention to provide a progressive multi-focal ophthalmic lenses which eliminates the drawbacks in the prior art, operating from a point of view different from that of the prior art. Multi-focal lenses having normal side viewing sights are provided such that the astigmatism zone in the prior art is formed into a spheric surface having no astigmatism. The most appropriate refractive power in the multi-focal lens is the dioptric power or refractive power (or index) which is the arithmetic mean of those of the distant viewing zone and the near viewing zone. When it has a power larger than that of the distant viewing zone, the sight field can be significantly broadened with respect to the intermediate distance.

In the progressive refractive surface of this invention, there is still the same arrangement of a distant viewing zone, the progressive zone and the near viewing zone, each of which is a smoothly associated serial curved surface, with there being no demarcations easily noticeable from the outside or by a third person. In contrast to the prior art, however, in the present invention substitute spheric surfaces (aniso surfaces) are provided with such surfaces, it is geometrically impossible to smoothly and directly associate the spheric surfaces without providing an intermediate curved surface.

Accordingly, an arbitrary arrangement of the demarcation between the serial convex surface and the spheric surface creates different levels between the two surfaces. However, in accordance with the invention the two surfaces are respectively extended thus resulting in crossing lines being the demarcation. With this arrangement there is no different level across over the entire demarcation area and such fact is advantageous from an aesthetic sense. Additionally, the demarcation can be arranged to be hardly seen from outside by providing a serial smooth convex surface at the demarcation, which is preferable in a visual sense.

DESCRIPTION OF THE PREFERRED EMBODIMENT

A preferred embodiment of this invention will be hereinafter discussed with reference to the accompanying drawings.

Figure 1:
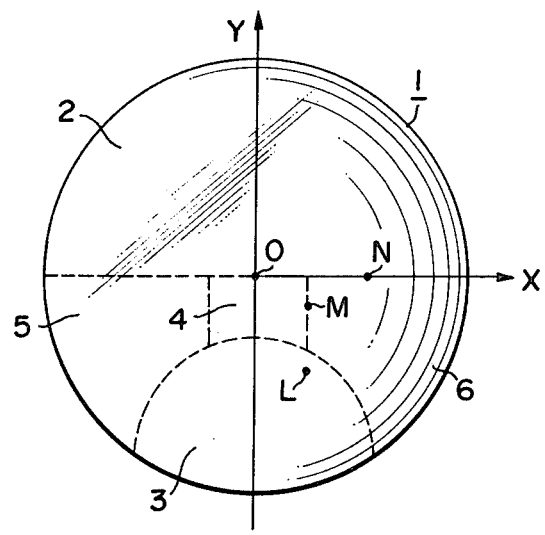
FIG. 1 is a front view of the conventional progressive multi-focal lens.
Figure 2:
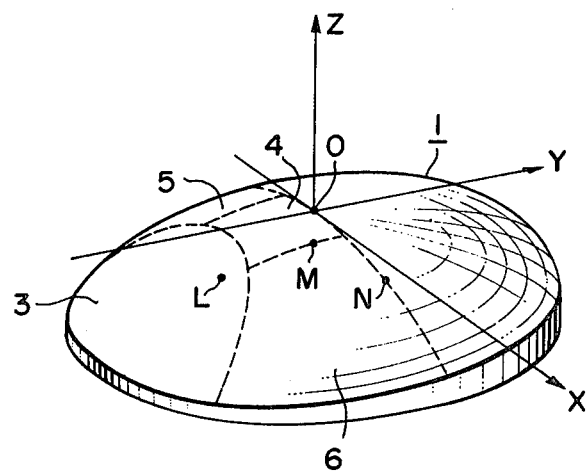
FIG. 2 is a perspective view of FIG. 1.

FIGS. 1 and 2 respectively show a front view and a perspective view of an example of the prior art progressive multi-focal lens. A lens 1 comprises a distant viewing zone 2, a near viewing zone 3, a progressive zone 4, and side zones 5, 6 beside the progressive and near viewing zones. The side zones are hereinafter referred to as a right side and a left side zone respectively.

Figure 3:
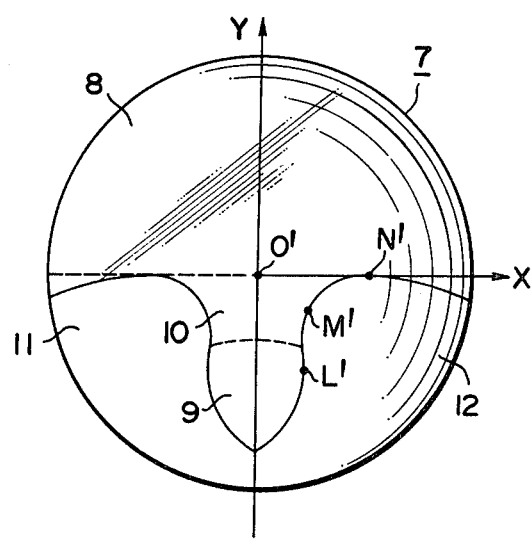
FIG. 3 is a front view of the progressive multi-focal lens of the embodiment of this invention.
Figure 4:
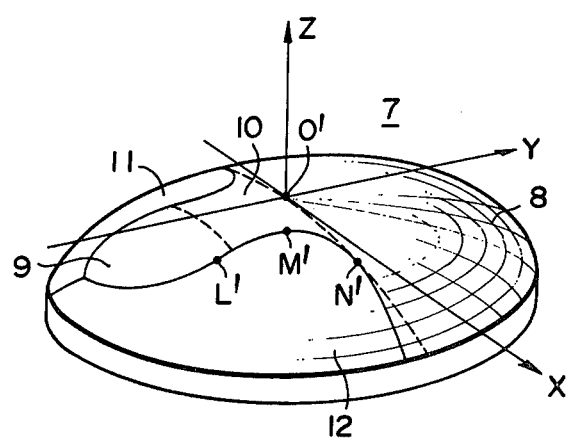
FIG. 4 is a perspective view of the FIG. 3.

FIGS. 3 and 4 respectively show a front view and a perspective view of one embodiment of the progressive multi-focal ophthalmic lens in accordance with the present invention.

The lens 7 comprises a distant viewing zone 8, a near viewing zone 9, a progressive zone 10, side portions 11, 12 beside the progressive zone and the near viewing zone, with the side zones hereinafter referred to as a right side zone and a left side zone. The demarcation of each zone as indicated in solid lines in the lenses 1, 7 is easily visually distinguished from the outside or by a third person. Those demarcations indicated in dotted lines are not easily distinguished.

A primary feature of this invention resides in the employment of spheric surfaces as the convex surface of the right and left side zones 11, 12. In accordance with the invention, each dioptric refractive power of the spheric surfaces of the side zones 11, 12 in this embodiment is the arithmetic mean value of the refractive power of the zones 8, 9.

The continuous convex surface comprising zones 2, 3, 4 of the lens 1 is the same as the continuous completely iso-curved surface (progressive refractive surface) comprising zones 8, 9, 10 of the lens 7, with the forms of the zones not being substantially different.

The present invention provides for improving the progressive refractive surface of the progressive multi-focal lens 1 of the prior art shown in FIGS. 1 and 2, to the progressive refractive surface of the progressive multi-focal lens 7 of the preferred embodiment of this invention shown in FIGS. 3 and 4. This is done by determining a positional relation between the iso-curved surfaces 8, 9, 10, and the spheric surfaces 11, 12 which are the feature of this invention; which is determined in accordance with the position of the curvature center of the spheric surfaces 11, 12 and the positions of the demarcations.

To this end, and for convenience of explanation, orthogonal coordinate axes X, Y, Z are defined in marked directions with origins, each origin being defined at the geometric center of the lens, respectively shown in FIGS. 1, 2, 3 and 4. The Z axis in FIGS. 1 and 3 are provided on a perpendicular direction with respect to the drawing paper. Points O in FIGS. 1 and 2, and points O' in FIGS. 3 and 4 respectively indicate the geometric centers of each lens.

First, provided on the progressive refractive surface of the progressive multi-focal lens 1 of the prior art shown in FIGS. 1 and 2 are three points $L(X_L, Y_L, Z_L)$, $M(X_M, Y_M, Z_M)$, and $N(X_N, Y_N, Z_N)$, which are shown as additional demarcations provided at the left side zone, in proportion to the areas of desired distant, progressive and near viewing zones.

Although the X, Y axes points of each L, M, N are arbitrarily determined, $X_L$ of X coordinate axis of the point L is selected to be 8 mm, $Y_L$ of Y coordinate axis to be $-15$ mm, $X_M$ of X coordinate axis of the point M to be 8 mm, $Y_M$ of Y coordinate axis to be $-5$ mm, $X_N$ of X coordinate axis of the point N to be 18 mm, and $Y_N$ of Y coordinate axis Y to be 0 mm.

The Z coordinate axis is easily determined of this prior art construction by thus setting the X and Y coordinate axes, since these three points L, M, N all have been selected on the progressive refractive surface of the conventional progressive multi-focal lens as mentioned above.

The parameters of the improved lens of this invention are defined and selected as follows. A curvature radius of the left side zone spheric surface is selected to be R; a curvature center is selected to be Q, and X, Y, Z coordinate axes of Q to be respectively $X_Q, Y_Q, Z_Q$. The R value can be easily selected since the spheric surface refractive power is the arithmetic mean of those of the distant and the near viewing zones as mentioned in accordance with this embodiment.

These three points, L, M, N are the points on the progressive refractive surface and also the points on the spheric surface, because these three are determined as the demarcations between the progressive refractive surface of the prior art and the spheric surface.

Accordingly, the following equations are provided for determining the relationship between each of X, Y, Z coordinate axes of said points L, M, N, Q and R.

$$R^2 = (X_L - X_Q)^2 + (Y_L - Y_Q)^2 + (Z_L - Z_Q)^2 \quad (1)$$

$$R^2 = (X_M - X_Q)^2 + (Y_M - Y_Q)^2 + (Z_M - Z_Q)^2 \quad (2)$$

$$R^2 = (X_N - X_Q)^2 + (Y_N - Y_Q)^2 + (Z_N - Z_Q)^2 \quad (3)$$

Solving the above three equations as simultaneous equations defines or determines the $X_Q, Y_Q, Z_Q$, i.e. the X, Y, Z coordinate axes points of Q.

Although the above discussion has been referenced to the left side zone of the lens, it also applies to the right side zone. In either case and in accordance with the invention, the conventional progressive multi-focal lens shown in FIGS. 1 and 2 is improved to be the progressive multi-focal lens of the embodiment of the present invention shown in FIGS. 3 and 4. To this end, the points L', M', N' shown in FIGS. 3 and 4 correspond to the points L, M, N shown in FIGS. 1 and 2.

Although this embodiment employs symmetrical spherical surfaces in the left and the right portions, each of the curvature radii and the side zones of the spherical surfaces can be easily made asymmetrically in the left and the right zones, and it should be understood that such a construction falls within the scope of this invention.

Thus, the improvements of the present invention eliminate all the large astigmatism found in the conventional progressive lens, and further provide a normal side view field with no distortion nor blurring of the image.

Furthermore, if the spheric surface refractive power is made to be the arithmetic mean value of the refractive powers of the distant and the near viewing zones, the area through which the intermediate distant sight which can be normally seen is greatly enhanced. In the prior art such sight was only seen through the portion near the center of the progressive zone. Thus, the lens of the present invention becomes a quite convenient progressive multi-focal lens. Additionally, provision of a continuous smooth surface at the demarcations between the distant, the progressive, and the near viewing zones, and the left and the right side regions, permits the lens demarcations to be hardly distinguishable from the outside or by a third person.

Although the present invention has been described with reference to a preferred specific embodiment, it should be understood that various modifications may be made thereto without departing from the true spirit and scope of the invention.

I claim:
1. A progressive multi-focal lens comprising:
    a spheric distant viewing zone having a desired surface refractive power at the upper portion of the lens;
    a spheric near viewing zone having a surface refractive power larger than that of the distant viewing zone at the lower portion of the lens;
    an a spheric progressive zone comprising a local spheric smooth series progressively increasing in its surface refractive power along a central longitudinal direction from the distant viewing zone to the near viewing zone, between these two zones; and
    spheric surfaces having their surface refractive power larger than that of the distant viewing zone but smaller than that of the near viewing zone provided at both the left and the right sides of the progressive zone and the near viewing zone.
2. A progressive multi-focal lens according to claim 1, further including at least a continuous and smooth curved surface at the demarcations intermediately provided at the spheric surface positioned at both of the left and the right sides of the progressive and the near viewing zones and, the distant, the progressive and the near viewing zones, so as to minimize visibility of the appearance of the demarcations.

* * * * *

UNITED STATES PATENT AND TRADEMARK OFFICE
CERTIFICATE OF CORRECTION

PATENT NO. : 4,472,036
DATED : September 18, 1984
INVENTOR(S) : Akira KITANI

It is certified that error appears in the above-identified patent and that said Letters Patent is hereby corrected as shown below:

Claim 1, line 8, please change "a spheric" to

--aspheric--

*Signed and Sealed this*

*Seventh* Day of *May 1985*

[SEAL]

*Attest:*

DONALD J. QUIGG

*Attesting Officer*    *Acting Commissioner of Patents and Trademarks*